(12) United States Patent
Zimmerbeutel et al.

(10) Patent No.: US 6,354,621 B1
(45) Date of Patent: Mar. 12, 2002

(54) AIRBAG MODULE

(75) Inventors: Bernd Uwe Zimmerbeutel, Remscheid; Jens Hannemann, Wuppertal, both of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/369,985

(22) Filed: Aug. 6, 1999

(30) Foreign Application Priority Data

Aug. 7, 1998 (DE) ........................................ 29814233 U

(51) Int. Cl.$^7$ .............................................. B60R 21/16
(52) U.S. Cl. .................... 280/728.2; 280/731; 280/732; 280/740; 280/743.1
(58) Field of Search .............................. 280/728.2, 740, 280/732, 93.1, 743.1

(56) References Cited

U.S. PATENT DOCUMENTS

| | | | | |
|---|---|---|---|---|
| 4,915,410 A | * | 4/1990 | Bachelder ................ | 280/728.2 |
| 5,356,174 A | * | 10/1994 | Rhein et al. ............. | 280/728.2 |
| 5,393,090 A | * | 2/1995 | Shepherd et al. ..... | 280/728.2 X |
| 5,433,472 A | * | 7/1995 | Green et al. ............ | 280/728.2 |
| 5,556,127 A | | 9/1996 | Boumarafi et al. | |
| 5,639,112 A | | 6/1997 | Phillon et al. | |
| 5,851,023 A | * | 12/1998 | Nagata et al. ....... | 280/728.2 X |
| 5,941,556 A | * | 8/1999 | Rose ....................... | 280/728.2 |
| 5,944,340 A | * | 8/1999 | Bohn et al. ............. | 280/728.2 |
| 5,947,510 A | * | 9/1999 | Athon et al. ............ | 280/728.2 |
| 6,056,313 A | * | 5/2000 | Lutz et al. ............... | 280/728.2 |
| 6,092,833 A | * | 7/2000 | Nariyasu ................ | 280/728.2 |
| 6,126,191 A | * | 10/2000 | Pepperine et al. ...... | 280/728.2 |
| 6,152,479 A | * | 11/2000 | Wagner et al. .......... | 280/728.2 |

FOREIGN PATENT DOCUMENTS

| | | |
|---|---|---|
| DE | 29706246 | 8/1997 |
| EP | 0790151 A | 8/1993 |
| EP | 0721864 A | 7/1996 |
| WO | 9308042 A | 4/1999 |

\* cited by examiner

*Primary Examiner*—Lanna Mai
*Assistant Examiner*—Toan C To
(74) *Attorney, Agent, or Firm*—Kathryn A. Marra

(57) ABSTRACT

A housing (10) is provided for a folded together inflatable airbag and a holder element (12) which can be locked at the housing, with the housing and the holder element bounding a reception region for a gas generator (14) in the locked state. In addition to an airbag and a gas generator, with the housing and the holder element, only two components are required in accordance with the invention, through which the manufacture may be simplified and manufacturing cost reductions may occur. For the assembly of the airbag module, the gas generator (14) is first arranged either at the housing (10) or at the holder element (12) and then the holder element is locked at the housing. The gas generator (14) is then already located in its final position in the airbag module. Through this the subsequent attachment of the folded together airbag in the housing is simplified since more than two parts which are to be connected together need never be brought into the correct relative position.

26 Claims, 2 Drawing Sheets

AIRBAG MODULE

TECHNICAL FIELD

The invention relates to an airbag module for motor vehicles.

BACKGROUND OF THE INVENTION

Airbag modules of this kind are known in principle and serve to mount a folded inflatable airbag together with a gas generator which inflates the airbag in the event of an accident as a unit in a motor vehicle e.g. as a driver's, a driver's mate's or a side airbag.

The problem (object) lying at the basis of the invention is to provide an airbag module for motor vehicles which is simply constructed and is easy to assemble.

SUMMARY OF THE INVENTION

This problem is solved through the features of claim 1 and in particular in that a housing for a folded together inflatable airbag and a holder element which can be locked at the housing are provided, with the housing and the holder element bounding a reception region for a gas generator in the locked state.

In addition to an airbag and a gas generator, with the housing and the older element, only two components are required in accordance with the invention, through which the manufacture may be simplified and manufacturing cost reductions may occur. For the assembly of the airbag module in accordance with the invention the gas generator is first arranged either at the housing or at the holder element and then the holder element is locked at the housing. The gas generator is then already located in its final position in the airbag module. Through this the subsequent attachment of the folded together airbag in the housing is simplified since more than two parts which are to be connected together need never be brought into the correct relative position.

In accordance with a preferred embodiment of the invention the reception region is formed at least substantially by a depression which is formed at the housing. Through this a particularly easy assembly of the airbag module in accordance with the invention is enabled in that the gas generator is simply laid into the depression and then the holder element is attached. The depression already provides for a secure positioning of the gas generator in the state without the holder element.

In accordance with a further preferred exemplary embodiment of the invention the holder element can be latched with the housing, with latching elements which are preferably formed on the holder element cooperating with latching receptions of the housing. Through this a particularly simple possibility of the locking of the holder element at the housing is provided, which enables an even more rapid assembly of the airbag module.

In accordance with a further preferred embodiment the holder element has, at its side which points to the reception region in its state of being locked to the housing, at least one damping section which in the state of being locked to the housing is elastically deformable by a gas generator which is arranged in the reception region. Through this the gas generator is pressed against the boundary wall of the reception region so that movements of the gas generator relative to the housing are avoided. This fixing of the gas generator within the reception region simplifies in particular the connection of the gas generator to a control device.

Further advantageous embodiments of the invention are set forth in the subordinate claims, in the description and in the drawings.

BRIEF DESCRIPTION OF THE DRAWINGS

The invention will be described in the following in an exemplary manner with reference to the drawings. Shown are.

DETAILED DESCRIPTION OF THE INVENTION

Figure 1:
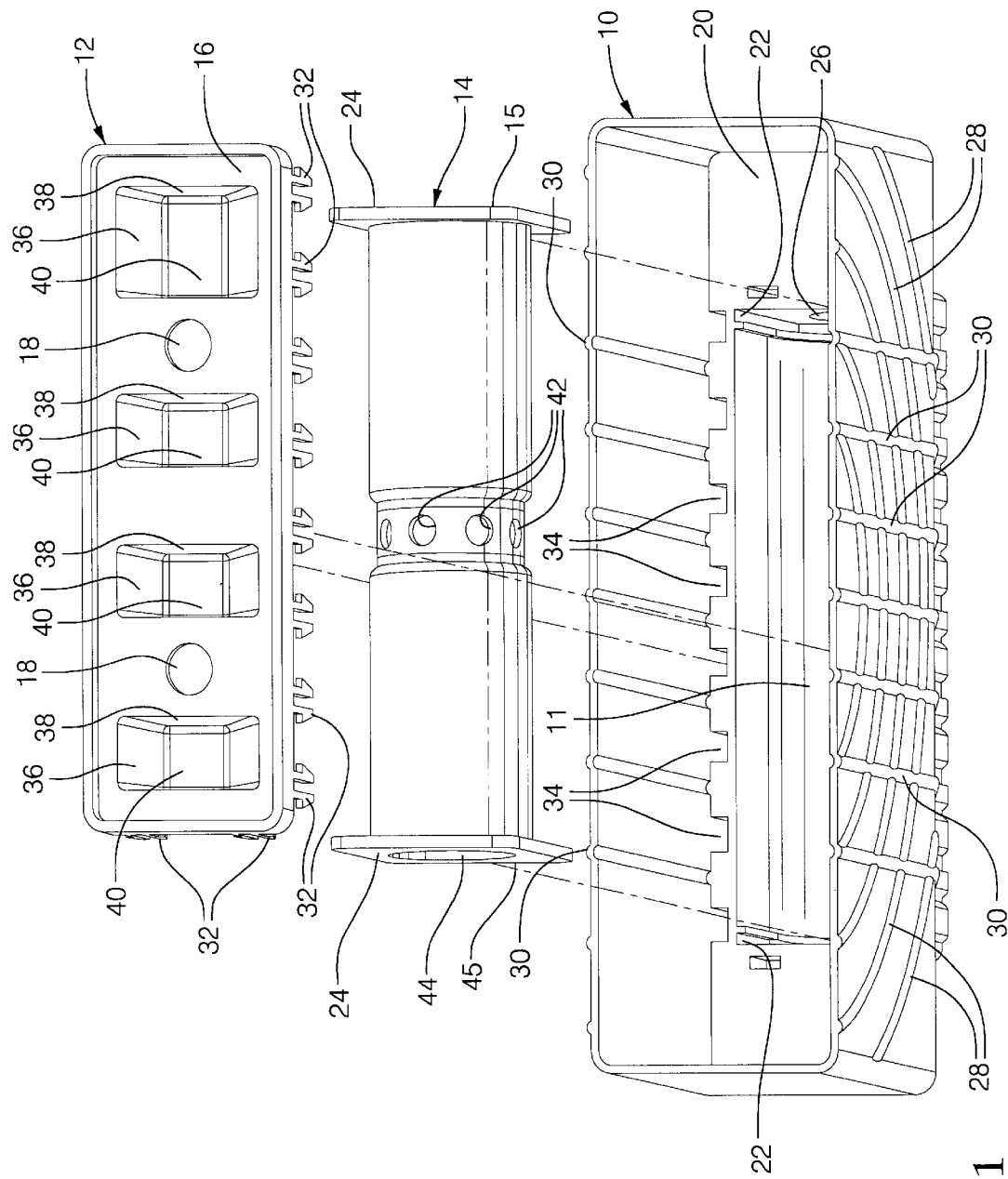
FIG. 1 an embodiment of an airbag module in accordance with the invention prior to assembly, and FIG. 2 the airbag module of FIG. 1 in the assembled state, and indeed in a first side view (FIG. 2a), in a second side view (FIG. 2b) and in a plan view (FIG. 2c).

The airbag module in accordance with the invention in accordance with FIG. 1 comprises a housing 10 which is preferably manufactured of plastic in an injection moulding process and which has the shape of a rectangular parallelepiped which is open at one side, in the housing wall 20 of which lying opposite to the open side, which will be designated in the following as the housing base, a depression 11 is formed. The depression 11 defines a reception region for a substantially cylindrical gas generator 14, the form of which is matched to the depression 11. The area which is left out by the depression 11 in the housing base 20 has a rectangular outline. The left out area is only slightly narrower, but however significantly shorter than the likewise rectangular housing base 20 and is arranged to be centered so that equally large base surfaces remain in the region of the end surfaces of the housing 10. By way of example, gas generator 14 is a two-stage gas generator 15.

The area which is left out by the depression 11 in the housing base 20 has a rectangular outline. The left out area is only slightly narrower, but however significantly shorter than the likewise rectangular housing base 20 and is arranged to be centered so that equally large base surfaces remain in the region of the end surfaces of the housing 10.

The side surfaces of the housing 10 are provided with stiffener ribs 28, 30, with one group of stiffener ribs 28 comprising sections of approximately concentric circles and the stiffener ribs 30 of the second group, which are designed as depressions at the housing inner wall which form corrugations, extend parallel to the edges of the housing 10 which bound the side and end surfaces.

In the region of the end surfaces of the housing 10 which bound the depression 11 a guide groove 22 for a corresponding positioning flange 24 of the gas generator 14 is in each case formed. The guide grooves 22 and the positioning flanges 24 which cooperate therewith serve as positioning means which provide for a correct angular orientation of the gas generator 14 with respect to its longitudinal axis in the depression 11 of the housing 10. In this way it is ensured that a connector 44 for a control device 45 which is provided at least in a front side of the gas generator 14 always has the same orientation with respect to the housing 10, through which the connecting of the gas generator 14 is facilitated in the assembly of the airbag module in accordance with the invention.

Latching receptions 34 are formed in the housing base 20 which are provided in the region of the housing base 20 which bounds the depression 11, and which are distributedly arranged around the depression 11. The latching receptions 34 are formed in each case as rectangular parallelepipeds which are open on their side remote from the housing base 20 and which project from the housing base 20.

A holder element 12 of the airbag module in accordance with the invention which is likewise preferably manufactured of plastic in the injection moulding process has a substantially rectangular base plate 16, the area of which is approximately as large as the area which is left out in the housing base 20 by the depression 11.

The holder element 12 is provided with a plurality of latching elements 32 which stand off from a side surface of the base plate 16 and are distributedly arranged corresponding to the latching receptions 34 of the housing 10 along the edge region of the base plate 16.

Each latching element 32 comprises a pair of pins which are elastically deformable through pressing together and which stand off at right angles from the base plate 16. Each pin has a locking nose which points away from the respective other pin.

Moreover, two circular cut-outs 18 are provided in the base plate 16 of the holder element 12 through which gas which is produced by the gas generator 14 can flow.

In addition, the base plate 16 is provided with four cut-outs 38 which in each case have a rectangular outline, with one cut-out—that lying farthest to the right in FIG. 1—being larger than the other three cut-outs in the embodiment in accordance with FIG. 1.

At the edge region of each cut-out 38 a strip-like material section which serves as a damping section 36 is connected to the holder element 12. The damping sections 36 have in each case a contact section 40 which extends approximately parallel to the base plate 16 and which is connected to the base plate 16 via two sections which extend at an inclination to the base plate 16 and diverge from one another in the shape of a V in the direction of the base plate 16. The contact sections 40 are at such a distance from the base plate 16 that in the assembled state of the airbag module in accordance with the invention they cooperate with the gas generator 14 which is arranged in the reception region and the damping sections 36 are elastically deformed by the gas generator 14.

Through the described forming of the damping sections 36, gas which is produced by the gas generator 14 can not only flow through the circular cut-outs 18 but also through the cut-outs 38.

Both the latching elements 32 and the damping sections 36 are preferably designed in a single piece with the base plate 16 of the holder element 12, which is thus in a single piece in this case.

The gas generator 14 is provided with gas exit openings 42 which are arranged eccentrically in the longitudinal direction and distributedly in the peripheral direction. The gas generator 14, which is asymmetrically formed in this way, is preferably designed as a two stage gas generator which can be connected at both end surfaces to a control device, with both of the end surfaces of the housing 10 which bound the depression 11 being provided with a cut-out 26 in this case.

Figure 2B:
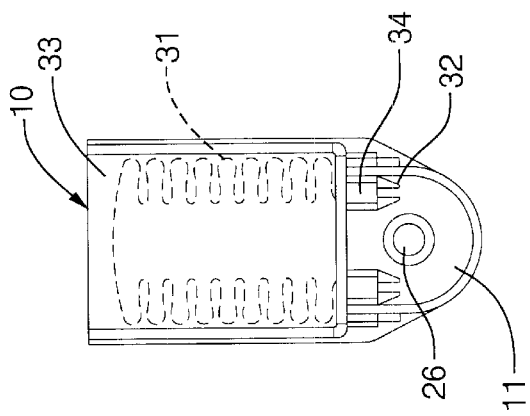
Figure 2A:
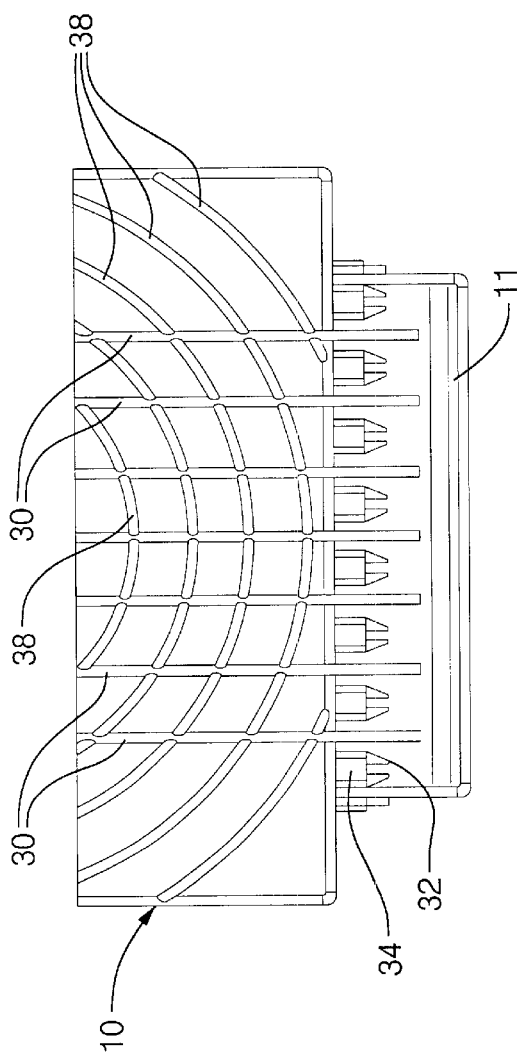

FIG. 2 shows the airbag module in accordance with the invention of FIG. 1 in the assembled state, with FIG. 2a being a side view of a side wall of the housing 10 which is provided with the stiffener ribs 28, 30. Recognizable are the differently oriented groups of stiffener ribs 28, 30 and the pins of the latching elements 32 of the holder element, which protrude with their free ends out of the latching receptions 34 of the housing 10, which are open at the bottom and which with their latching noses engage behind the lower edge of the latching receptions 34 in a locking manner.

FIG. 2b is a side view of an end surface of the housing 10 which is not provided with stiffener ribs and in which in particular a cutout surface 26 which serves for the connection of the gas generator to the control device is recognisable in one of the end surfaces of the housing 10 which bound the depression 11.

Figure 2C:
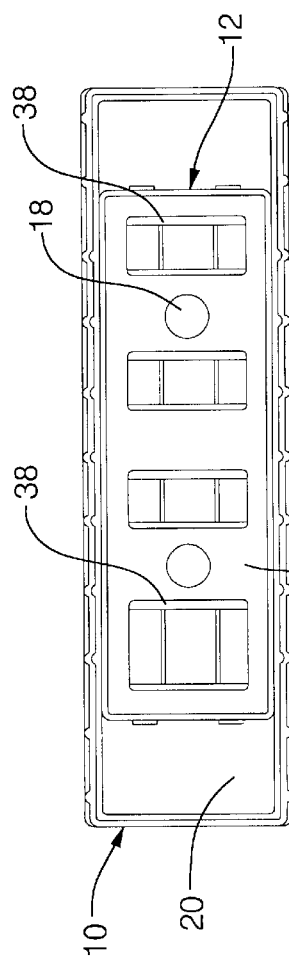

FIG. 2c is a view into the interior of the housing 10 and onto the holder element 12 which is locked to the housing 10. The base plate 16 of the holder element 12 serves together with the housing base 20 which remains at both sides of the depression as a support surface for a folded together airbag.

For the assembly of the airbag module in accordance with the invention the gas generator 14 is first laid into the depression 11 of the housing 10, with the positioning flanges 24 of the gas generator 14 being pushed into the guide grooves 22 of the housing 10. Through the matching of the depression 11 to the cylindrical shape of the gas generator 14 and the corresponding rounding off of the guide grooves 22 and the positioning flanges 24 it is ensured that the gas generator 14 can be arranged in the depression 11 only in its correct position.

Then an airbag 31 is attached to the holder element 12 in that the latching elements 32 of the holder element 12 are pushed through holes which are formed in an edge region of the airbag which bounds the open end of the airbag to secure the airbag in an airbag cavity 33 of the housing 10.

Then the holder element 12 is pressed with its latching elements 32 into the latching receptions 34 of the housing 10 and locked in this way to the housing 10. The housing 10 and the holder element 12 thus bound a cage-like reception region for the gas generator 14 in which the gas generator 14 is fixed in position through the cooperation with the damping sections 36 which are formed on the holder element 12 and is dampingly seated. At the same time the airbag is mounted in this way at the housing 10.

Through the cooperation of the housing 10 and the holder element 12 an additional gas generator housing is thus created inside the housing 10.

In the assembled state thus a space having the shape of a rectangular parallelepiped in the described embodiment and which is bounded by the housing walls and the holder element 12 is available for the folded together airbag. The base plate 16 of the holder element 12 serves together with the remaining housing base 20 as a support surface for the folded together airbag. The housing 10 is closed by a non-illustrated covering cap which is secured to the housing 10.

In the event of an accident the gas generator 14 is triggered via the non-illustrated control device, with the gas produced flowing out of the reception region for the gas generator 14 through the circular cut-outs 18 and the rectangular cut-outs 38 and into the folded together airbag. As a consequence the base plate 16 of the holder element 12 acts as a kind of nozzle plate which provides for an inflation of the airbag which takes place over a comparatively large area. The larger of the four cut-outs 38, which is located furthest to the right in FIG. 1, takes into account the asymmetry of the gas generator 14 and provides for the gas flowing uniformly distributed over the surface of the base plate 16 into the airbag.

In accordance with the invention the holder element 12 thus fulfils several functions at the same time in that it fixes the gas generator 14 in its desired position, provides an anchoring for the airbag and serves as a diffusor which provides for the gas produced by the gas generator 14 flowing with a distribution over as large an area as possible and as uniformly as possible into the airbag.

What is claimed is:

1. An airbag module, comprising:

a housing;

a holder element being configured and dimensioned to be inserted and locked within an airbag cavity which is defined by said housing, said holder element providing a means for retaining a portion of an airbag within said airbag cavity, said housing and said holder element bounding a reception region for a gas generator, said reception region being formed by a depression is formed in said housing, said housing having a rectangular parallelepiped shape which is open at one side, and said depression being formed in a housing wall that lies opposite to said open side, wherein said housing and/or said holder element are/is provided with means for positioning said gas generator, and wherein said means for positioning is a pair of guide grooves for positioning a pair of flanges of said gas generator, said flanges being located at either end of said gas generator.

2. An airbag module as in claim 1, wherein said holder element has a substantially rectangular base plate.

3. An airbag module as in claim 1, wherein said holder element is designed for mounting of an airbag.

4. An airbag module as in claim 1, wherein said holder element has at least one cut-out for gas which is produced by said gas generator.

5. An airbag module as in claim 1, wherein the surface of said holder element which faces away from said reception region is designed as a support surface for a folded together airbag, said support surface extending substantially parallel to said housing wall which is provided with said depression.

6. An airbag module as in claim 1, wherein said holder element is latched to said housing by latching elements which are preferably formed on said holder element, said latching elements cooperating with latching receptions of said housing.

7. An airbag module as in claim 6, wherein said latching receptions are formed in a boundary region of said housing wall which bounds said depression and said latching receptions are preferably distributedly arranged around said depression.

8. An airbag module as in claim 6, wherein said latching elements stand off from one side surface of said holder element, said latching elements preferably being arranged in said boundary region of said side surface and said latching elements preferably distributedly arranged along said boundary region.

9. An airbag module as in claim 1, wherein said holder element has at least one damping section which points to said reception region when said holder element is locked to said housing, said damping section being elastically deformable by said gas generator which is arranged in said reception region.

10. An airbag module as in claim 9, wherein said damping section is formed as a strip-like material section which is connected at its ends to said holder element.

11. An airbag module as in claim 1, wherein said holder element has at least one cut-out with preferably approximately rectangular outline and a damping section being connected to said holder element at a boundary region which bounds said cut-out.

12. An airbag module as in claim 11, wherein said damping section has a contact section which extends approximately parallel to a base plate of said holder element, said contact section retains said gas generator in said reception region.

13. An airbag module as in claim 1, wherein said wall in said housing defining said depression includes a pair of areas located on either side of said depression.

14. An airbag module as in claim 1, wherein said reception region is shaped similar to said gas generator.

15. An airbag module as in claim 14, wherein said gas generator is cylindrical.

16. An airbag module as in claim 1, wherein said depression has a cutout for connection of said gas generator to a control device.

17. An airbag module as in claim 1, wherein said housing includes a plurality stiffener ribs oriented into groups of stiffener ribs wherein each group extend at least substantially parallel to one another.

18. An airbag module as in claim 1, wherein said reception region is designed for the reception of a two-stage gas generator.

19. An airbag module as in claim 1, wherein said reception region is designed for the reception of a substantially cylindrical gas generator which has gas exit openings that are eccentrically arranged in the longitudinal direction and distributedly arranged in the peripheral direction can be connected at least at one end surface to a control device.

20. An airbag module, comprising:

a housing, having a rectangular shape which is open at one side;

a receiving area for a gas generator, said receiving area being defined in a wall of said housing, said wall being opposite to said open side of said housing;

a holder element being configured and dimensioned to be inserted and locked within an airbag cavity which is defined by said housing, said holder element covering said receiving area and retaining a gas generator in said receiving area when said holder element is inserted and locked into said airbag cavity, said holder element securing a portion of an airbag to said housing, wherein said receiving area includes a pair of retaining grooves for receiving and engaging a pair of flanges of said gas generator.

21. An airbag module as in claim 20, wherein said holder element includes a plurality of retaining members which make contact with said gas generator when said holder element is inserted and locked into said airbag cavity.

22. An airbag module as in claim 21, wherein said plurality of retaining members are deformable members which depend outwardly from said holder element.

23. An airbag module as in claim 20, wherein said holder element includes a plurality of latching elements which are received and engaged in a plurality of relaxing openings in said housing.

24. An airbag module as in claim 20, wherein said housing and said holder element are formed out of plastic.

25. An airbag module as in claim 20, wherein said holder element secures an airbag to said housing.

26. An airbag module as in claim 20, wherein said holder element includes an opening for allowing fluid communication between said receiving area and said airbag cavity.

* * * * *